April 9, 1940.                F. L. ALBEN                2,196,406
                           MOTOR SUSPENSION
                         Filed Feb. 26, 1938              2 Sheets-Sheet 1

WITNESSES:                                               INVENTOR
                                                        Frank L. Alben.
                                                             BY
                                                                ATTORNEY April 9, 1940.　　　　　F. L. ALBEN　　　　　2,196,406
MOTOR SUSPENSION
Filed Feb. 26, 1938　　　2 Sheets-Sheet 2

WITNESSES:
C. J. Weller.
H. S. Chilcott

INVENTOR
Frank L. Alben.
BY G. M. Crawford
ATTORNEY

Patented Apr. 9, 1940

2,196,406

UNITED STATES PATENT OFFICE 2,196,406

MOTOR SUSPENSION

Frank L. Alben, Pittsburgh, Pa., assignor to Westinghouse Electric & Manufacturing Company, East Pittsburgh, Pa., a corporation of Pennsylvania Application February 26, 1938, Serial No. 192,759

7 Claims. (Cl. 105—139)

My invention relates, generally, to motor suspensions and more particularly to spring suspensions for electric motors of the axle-hung type which are utilized to drive vehicles.

An object of my invention, generally stated, is to provide a nose suspension for an axle-hung motor which shall be flexible in operation and which may be economically manufactured and installed.

A more specific object of my invention is to provide a resilient nose suspension for an axle-hung motor which has similar characteristics of action for either direction of motion of a vehicle.

Another object of my invention is to provide a spring suspension unit for an axle-hung motor which may be readily assembled in a vehicle truck frame.

Other objects of my invention will be explained fully hereinafter or will be apparent to those skilled in the art.

In accordance with one embodiment of my invention, the nose of an axle-hung motor is resiliently supported in a truck frame by means of a spring suspension unit which is so constructed that compensation may be made for the weight of the motor to obtain similar characteristics of action for either direction of motion of the vehicle, thereby improving the operation of the vehicle, particularly at certain critical speeds.

For a fuller understanding of the nature and objects of the invention, reference may be had to the following detailed description, taken in conjunction with the accompanying drawings, in which.

Figure 1:
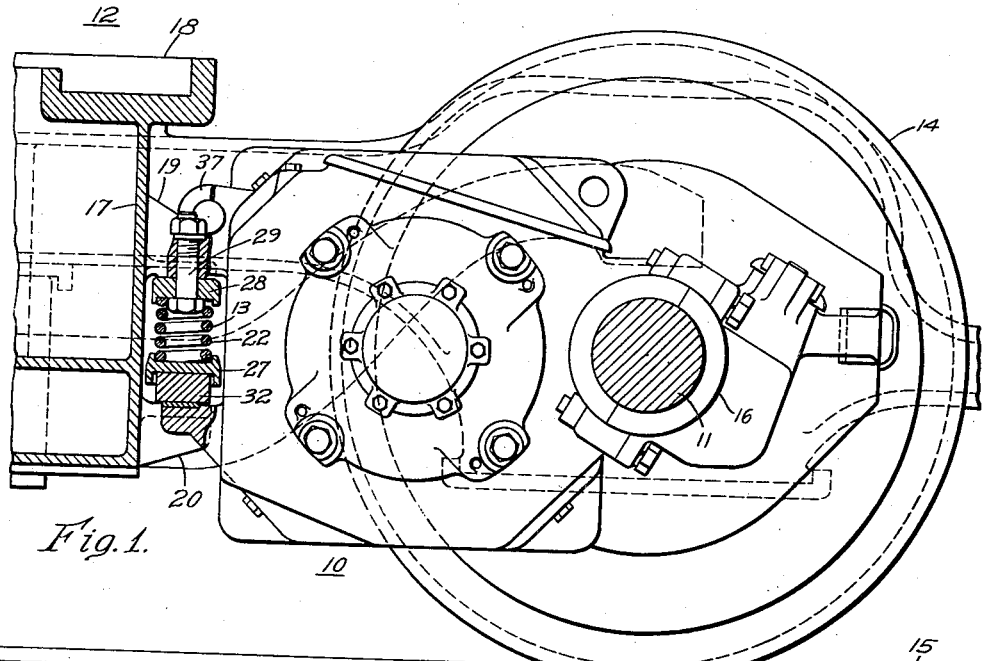
Figure 1 is a view, partly in elevation and partly in section, of an axle-hung motor with a nose suspension unit constructed in accordance with my invention.

Referring now to the drawings, and particularly to Fig. 1, the structure shown comprises a motor 10 of the axle-hung type having one side supported by a wheel axle 11 and the other side resiliently supported in a vehicle truck frame 12, only a portion of which is shown, by a double-acting spring suspension unit 13.

The motor 10 may be of the usual axle-hung type suitable for driving an electrically propelled vehicle equipped with wheels 14 which run on rails 15. One side of the motor 10 is mounted on the axle 11 by means of a bearing 16, which may be of the sleeve type. The motor may be geared to the axle in the usual manner by means of gear members (not shown).

The vehicle truck 12 may be of either the swing bolster type or the fixed bolster type. As shown, the truck is provided with a cross member or transom 17 which carries a center pin 18. The transom 17 is provided with two upper and two lower horizontally projecting lugs 19 and 20, respectively, for supporting the side of the motor 10 opposite the axle 11.

In order that the vehicle truck will have similar characteristics of action for either direction of motion of the vehicle, the resilient suspension for the nose of the motor 10 is so constructed that compensation is made for the weight of the motor carried by the truck transom. It will be understood that when the vehicle is traveling in one direction, the nose suspension is required to counteract the torque of the motor and support the weight of the motor carried by the truck transom. When the vehicle is traveling in the other direction, the reaction on the suspension unit is equal to the difference between the torque reaction of the motor and the weight of the motor carried by the truck transom under static conditions.

Therefore, the reactions on the suspension unit are different for the different directions of motion of the vehicle and it is necessary to compensate for the weight of the motor carried by the truck transom in order that the motor nose will be resiliently retained in substantially the same position in the truck frame and that vibrations set up by irregularities in the track will not be transmitted through the gears and the motor to the vehicle truck frame and thence to the body of the vehicle.

In the present structure, the weight compensation is effected by providing a suspension unit having a plurality of spring members which are divided into two groups. As illustrated, the one group comprises two springs 21 and the other group comprises three springs 22. However, it will be understood that any desired number of springs, or other resilient members, may be provided in each group.

Figure 2:
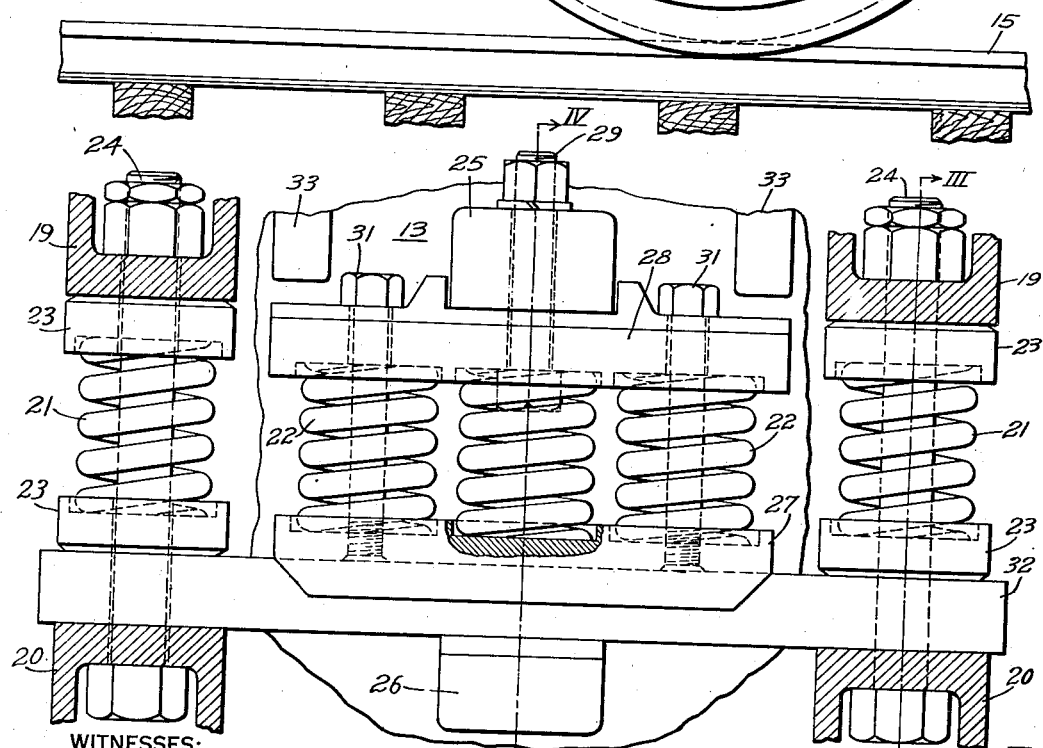
Fig. 2 is an enlarged view, in elevation, of the nose suspension unit.
Figure 3:
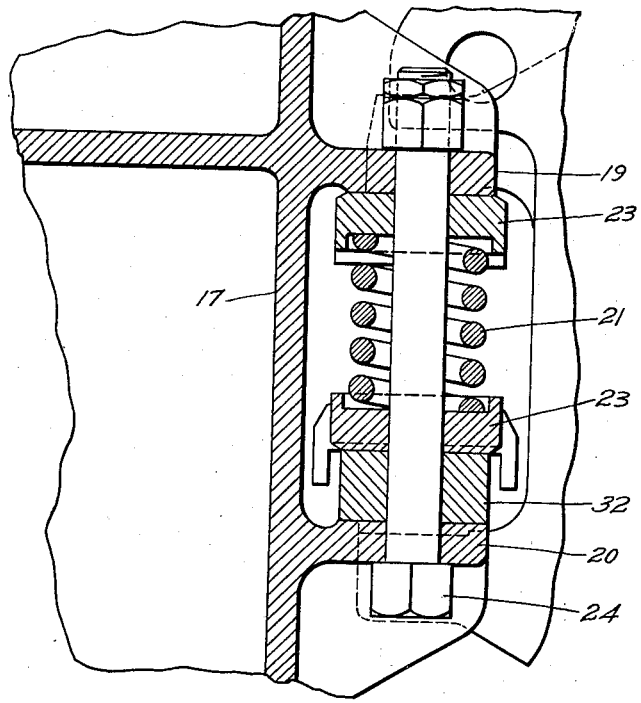
Fig. 3 is a view, in section, taken along the line III—III of Fig. 2.
Figure 4:
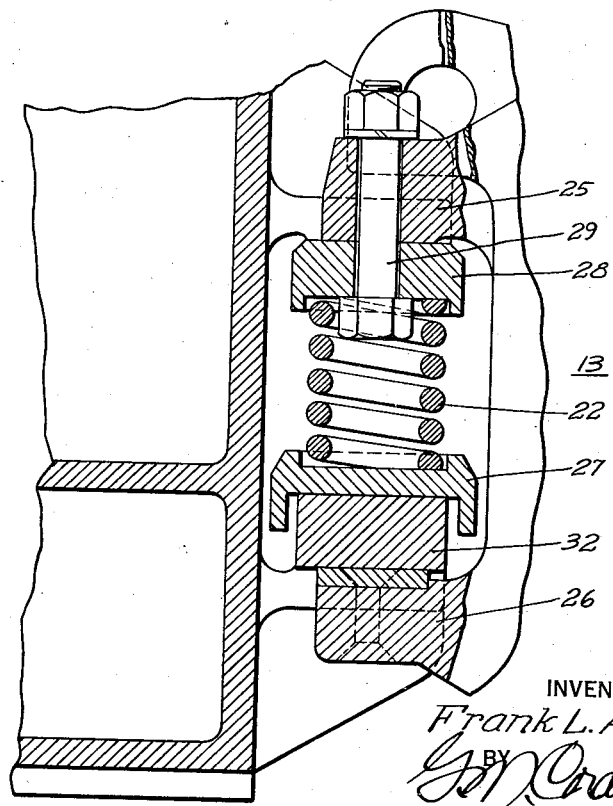
Fig. 4 is an enlarged view, also in section, taken along the line IV—IV of Fig. 2.

The springs 21 are disposed between the supports 19 and 20 on the transom 17, with the ends of each spring seated in cups 23 which are retained in position by bolts 24. Each bolt 24 extends through a pair of lugs 19 and 20, two cups 23 and the center of one of the coil springs 21, as shown in Figs. 2 and 3. The springs 22 are disposed between spaced lugs 25 and 26, which constitute the nose of the motor 10. The lower ends of the springs 22 are seated in a member 27 which is of a channel shape. The upper ends of the springs 22 are seated in a rectangular bar 28 that is secured to the lug 25 on the motor 10 by means of a bolt 29. The outer springs 22 are retained in position by bolts 31 which connect the bar 28 and the channel 27. Each bolt 31 passes through one of the outer springs 22, and the center spring 22 cannot be removed without loosening the bolts 31 in the outer springs.

When assembling the suspension unit, the bar 28 is secured to the lug 25 by the bolt 29 and the springs 22 placed between the bar 28 and the channel 27. The bolts 31 are then screwed into the channel and the springs 22 compressed sufficiently to permit a rectangular bar 32 to be inserted between the channel 27 and the lower lug 26 on the motor 10. The springs 21 and cups 23 are then placed in position between the top of the bar 32 and the upper lugs 19 on the transom and the bolts 24 inserted through the bar 32, the lugs 19 and 20 and the springs 21, as previously described.

In this manner, the springs 22 function to support the weight of the motor carried by the truck transom and to counteract the torque reaction of the motor when it is in a downward direction. The springs 21, which function independently of the springs 22, are only required to counteract the upward torque reaction less the weight of the motor. Therefore, the combined strength of the group of springs 22 is greater than the strength of the springs 21, thereby compensating for the weight of the motor.

It will be seen that the downward force is carried by the upper lug 25 on the motor, the three springs 22, the bar 32 and the lower lugs 20 on the transom 17. The upward force is carried by the lower lug 26 on the motor, the bar 32, the two springs 21 and the upper lugs 19 on the transom. Therefore, the two groups of springs function independently of each other and the characteristics of each group can be such as to provide the necessary resiliency to prevent the transmission of vibration to the truck frame during travel in either direction, and also to maintain the motor nose in the desired position in the truck frame.

As a safety measure, stop members 33 are provided on the motor to prevent its nose from dropping to the track in case of failure of the upper lug 25. The stops 33 are disposed to strike the bar 28, thereby supporting the motor.

From the foregoing description, it is apparent that I have provided a resilient suspension for an axle-hung motor which is efficient in operation and which may be readily assembled in a vehicle truck and economically manufactured. Furthermore, the operating characteristics of a vehicle truck are improved by utilizing the nose suspension herein disclosed.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. The combination with a wheel axle and a vehicle truck frame, of a motor having one side supported by the wheel axle, a plurality of springs for supporting the other side of the motor in the truck frame, said springs being divided into groups, one of which is disposed to counteract the torque of the motor in one direction and the other of which is disposed to support the motor and counteract the torque in the other direction, thereby providing similar characteristics of action for either direction of motion of the vehicle, both groups of springs being disposed in the same horizontal plane, and a bar movably disposed in the truck frame at the same end of both groups of springs and cooperating with one group in supporting the motor and counteracting the motor torque in one direction and with the other group in counteracting the motor torque in the other direction.

2. Means for resiliently supporting the nose of an axle-hung motor in a vehicle truck frame comprising a bar movably secured in the truck frame, a spring member cooperating with said bar to counteract the torque of the motor in one direction, and another spring member cooperating with said bar to support the motor and counteract its torque in the other direction, said latter spring member having different operating characteristics from the first-named spring member, thereby compensating for the weight of the motor, both of said spring members being disposed in the same horizontal plane on the same side of said bar.

3. Means for resiliently supporting the nose of an axle-hung motor in a vehicle truck frame comprising a bar movably secured in the truck frame, a plurality of spring members cooperating with said bar to counteract the torque of the motor in one direction, and additional spring members disposed to support the motor and counteract its torque in the other direction, said additional spring members operating independently of the first named spring members, thereby compensating for the weight of the motor, all of said spring members being disposed in the same horizontal plane on the same side of said bar.

4. Means for resiliently supporting the nose of an axle-hung motor in a vehicle truck frame comprising, a plurality of spring members disposed to counteract the torque of the motor in one direction, and additional spring members disposed to support the motor and counteract its torque in the other direction, said additional spring members operating independently of the first-named spring members, thereby compensating for the weight of the motor, means for connecting the first-named spring members to the truck frame, means for connecting the additional spring members to the motor independently of the first-named spring members, and a movable bar disposed between said first-named spring members and the truck frame and between said additional spring members and the motor for transmitting the torque reaction to the truck frame.

5. Means for resiliently supporting the nose of an axle-hung motor in a vehicle truck frame comprising, a plurality of spring members disposed to counteract the torque of the motor in one direction, and additional spring members disposed to support the motor and counteract its torque in the other direction, said additional spring members operating independently of the first-named spring members, thereby compensating for the weight of the motor, said first-named spring members being disposed between projecting lugs on the truck frame, and said additional spring members being disposed between projecting lugs on the motor, and a horizontally disposed bar releasably engaged by part of said lugs on the truck and the motor frames and cooperating with all of said spring members in counteracting the motor torque.

6. In a vehicle truck structure, in combination, a truck frame, a wheel axle, a motor having one side supported by the wheel axle, resilient members for suspending the other side of the motor in the truck frame, a portion of said resilient members being disposed to support the weight of the motor and counteract the motor torque in one direction, the remainder of said resilient members being disposed to counteract the motor torque in the opposite direction, thereby providing similar characteristics of action for either direction of motion of the vehicle, all of said resilient members being disposed in the same horizontal plane, and a bar spanning all of said resilient members and movably disposed in the truck frame to cooperate with the first portion of the resilient members in supporting the motor weight and counteracting the motor torque in one direction and to cooperate with the remainder of said resilient members in counteracting the motor torque in the opposite direction.

7. In a vehicle truck structure, in combination, a truck frame, a wheel axle, a motor for driving the vehicle, said motor having one side supported by the wheel axle, a plurality of resilient members for suspending the other side of the motor in the truck frame, some of the resilient members being disposed to support the motor and counteract the torque of the motor in one direction and others of said resilient members being disposed to counteract the torque of the motor in the opposite direction, thereby providing similar characteristics of action for either direction of motion of the vehicle, all of said resilient members being disposed in the same horizontal plane, and a bar movably disposed in the truck frame to cooperate with one portion of the resilient members in supporting the motor weight and counteracting the motor torque in one direction and to cooperate with the other portion of the resilient members in counteracting the motor torque in the opposite direction.

FRANK L. ALBEN.